United States Patent [19]
van Elsen

[11] Patent Number: 4,542,274

[45] Date of Patent: Sep. 17, 1985

[54] DEVICE FOR APPLYING SYMBOLS TO PROTEIN-CONTAINING MATERIAL

[76] Inventor: Johannes J. M. van Elsen, Dr. Kuyperlaan 9, 3445 CK Woerden, Netherlands

[21] Appl. No.: 465,653

[22] Filed: Feb. 10, 1983

[51] Int. Cl.[4] ............................................. H05B 6/46
[52] U.S. Cl. .............................. 219/10.81; 219/10.57; 219/121 LV; 219/229; 128/303.13; 128/804
[58] Field of Search ................. 219/121 LV, 228, 227, 219/10.57, 10.81; 128/804, 303.13, 303.14, 316

[56] References Cited

U.S. PATENT DOCUMENTS 1,995,725 3/1935 Wappler .................... 128/303.14
3,916,143 10/1975 Farrell ...................... 219/121 LV

FOREIGN PATENT DOCUMENTS 1056304  5/1952 Fed. Rep. of Germany.
2855981 12/1977 Fed. Rep. of Germany.
  20304 of 1890 United Kingdom ............... 219/227

Primary Examiner—Roy N. Envall, Jr.
Assistant Examiner—Marvin M. Lateef
Attorney, Agent, or Firm—Fleit, Jacobson, Cohn & Price

[57] ABSTRACT

A device for applying marking symbols to an animal's hide, a piece of meat's surface and like protein-containing tissue by locally dielectrically heating the tissue using high frequency electromagnetic energy to thereby dissect the protein structure and produce a mark having a different color than the surrounding tissue. The device comprises a stamping member including a metal symbol electrode having a protruding portion which is applied in use to the protein-containing tissue and an electrically insulating holder, such as a refractory material, in which the electrode is protrudingly mounted; a high frequency generator having a frequency range of from 2 to 22 MHz, most preferably from 2 to 4 MHz, and an output power of from 20 to 1000 Watts; and preferably a switching means for selectively establishing electrical connector between the stamping member and the high frequency generator to thereby send electromagnetic energy into the tissue upon which the protruding portion of the electrode is applied. The electrode remains cold and the operation is therefore painless to a live animal while only minimally altering the meat and hide. An earth connection for the protein-containing tissue is not necessary when the generator's output resistance is 50 Ohms or less.

20 Claims, 3 Drawing Figures

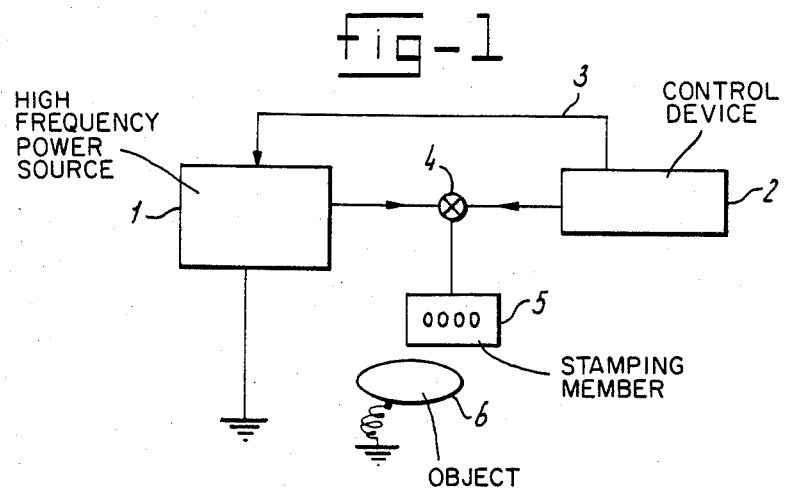
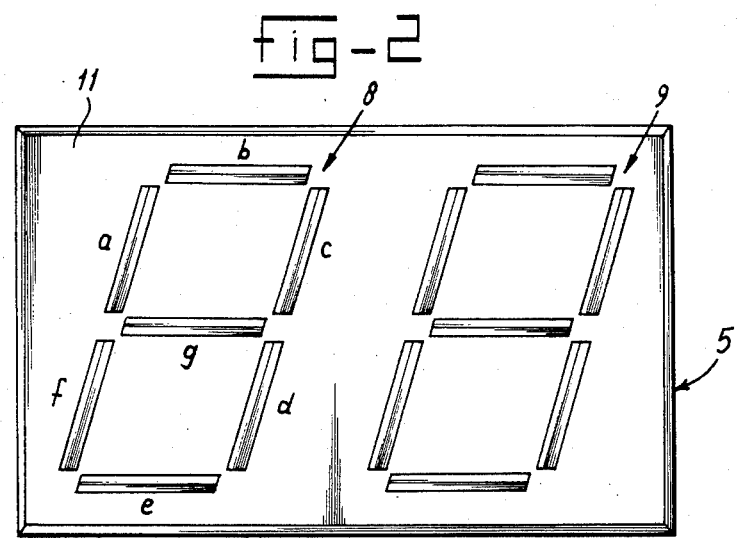
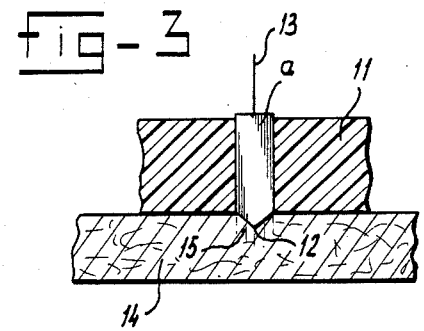

DEVICE FOR APPLYING SYMBOLS TO PROTEIN-CONTAINING MATERIAL

BACKGROUND OF THE INVENTION

1. Field of the Invention

The invention relates to a device for applying symbols to protein-containing material, such as the skin of an animal or meat, said device having a stamping member containing the symbol or symbols in the form of an electrode, said stamping member being connected through a switch to an electric source of energy.

2. Description of the Prior Art

A device of this type is described in the published German patent application No. 28 55 981. This known device has symbols formed by lines by means of which digits can be composed, with each symbol in the form of an electrode which forms a resistance in an electric circuit and can be heated to obtain the required temperature by closing the circuit.

This known device is based upon the well known, old manner of branding living or dead animals by using a marking iron which is heated to the required temperature, previously in an open fire, and then pressed upon the skin of the living or dead animal with the result that the mark is burned deeply into the skin of the animal or the meat of the slaughtered animal.

The device known from said German specification No. 28 55 981 has the advantage that by choosing the right composition of symbol electrodes, each digit or combination of digits can be formed so that marking with different figures can be done with one single device.

This known device, however, has the disadvantage that its application upon living animals is painful. Its application on meat of slaughtered animal destroys part of the meat, while application upon a hide usually makes useless a large area of the hide. Although different figures can be composed with this known device, the operation with said device is slow because symbols heated in composing a certain figure have to cool first before a figure can be applied in which said previously heated symbol may not appear.

SUMMARY OF THE INVENTION

The purpose of the invention is to obtain a device by means of which marking is less painful, does not disturb the meat and hardly disturbs the hide.

This is achieved according to the invention in a very simple way by using as the source of energy a high frequency generator which, through the electrode or electrodes which form the symbol of a figure, send electromagnetic waves into the area upon which a symbol electrode is applied. Said electromagnetic waves generate a change in the protein structure of the hide or in the area immediately below it by dielectric heating of the tissue. Experiments have shown that the energy of the electromagnetic waves transforms the protein into carbon, water, amino acids and parts thereof. This leads to a change in color which makes the mark clearly visible.

The electrode, however, remains cold so that the operator never needs to wait for the electrodes to cool down before he applies a different figure. The fact that the electrode remains cool also means that a live animal hardly feels the application of the device. Accordingly, cattle or the like can be marked without irritation and this is of particular importance when the marking has to be done in a slaughter house. To avoid irritation, the known manner of marking always only took place after the killing of the animal. With the present invention, the marking may be done prior to stunning, which is especially important if one takes into account that irritation of cattle, and in particular of pigs, to be slaughtered prior to stunning should be avoided because it can reduce the meat quality.

After marking with the device according to the invention and feeding the carcass of the slaughtered animal through a dehairing station, the mark appears in a color which is lighter than the surrounding skin. Due to the fact that the high frequency waves of the device according to the invention dissect the protein structure into protein particles, loose molecules, amino acids and carbon, the structure of the skin at the location of the mark has obtained a larger porosity which may explain the lighter color of a mark after passage of the carcass through a hot bath and a singeing oven.

Preferably the frequency range lies between 2 and 22 MHz, most preferably between 2 and 4 MHz, with an output power between 200 and 1000 Watts.

The symbols preferably have the form of alphanumerical figures and in a manner well known otherwise, e.g., from the earlier cited German specification, the symbols may be straight lines from which digits can be composed. Due to the fact that no heating of the electrodes takes place a fast change from one digit to another one is possible.

According to the invention, preferably each stamping member comprises a holder of refractory and electrically insulating material, such as ceramic material, surrounding a metal electrode which protrudes from the surrounding material. This allows for a simple construction. Preferably, the protruding portion is V-shaped in cross-section which appears to be the best shape to change the protein structure in the immediate vicinity of an electrode applied upon the skin or meat and supplied with the electromagnetic waves.

Output resistance should be low and not exceed 50 Ohm in which case an earth connection of the animal or meat is not necessary.

BRIEF DESCRIPTION OF THE DRAWINGS

The invention now will be further described with reference to the drawings.

FIG. 1 is a simplified block diagram of the device according to the invention.

FIG. 2 is a front view of a stamping member forming part of the device according to the invention.

FIG. 3 shows schematically in section the shape of each electrode and its application upon the skin.

DESCRIPTION OF THE PREFERRED EMBODIMENTS

In the diagram of FIG. 1, a high frequency power source 1, for example, a high frequency generator for a high frequency power transmitter is indicated.

A control device 2 is indicated as having an on and off switching connection line 3 with the high frequency generator 1, which generator and control device, through a switching device 4, are connected to one or more electrodes of a stamping member 5. The control device 2 has been designed in such a way that when the key of, e.g., digit 7, is touched, the high frequency of the generator 1 is fed by means of the selected connections and, for the time required, to those electrodes of the stamping member 5 by means of which the digit 7 can be made by applying the stamping member 5 upon an object 6. The object 6 is shown as being electrically connected to ground.

The time of operation of the high frequency generator is short, e.g., 0.1 second.

In the block diagram of FIG. 1, the high frequency generator has an output of 1000 Watts as its maximum and operates with a frequency of 3.5 MHz.

The output energy and frequency of course can be adjusted and adapted to the circumstances of each object to be treated by means of experiments.

FIG. 2 shows the face of a stamping member 5 to be applied upon an object 6. Shown are two groups 8 and 9 of electrodes a,b,c,d,e,f, and g embedded in ceramic material 11 with a V-shaped edge 12 protruding from said ceramic material 11. Each electrode is connected to a switching member 4 by means of a lead 13 and the connection of each electrode a to g inclusive of group 8 and/or 9 with a generator 1 can take place by microprocessor controlled relays of the control device 2.

Each group of electrodes can form, in a well known way, each digit from 0 to 9.

FIG. 3 shows an electrode a with a V-shaped tip 12 and with ceramic holding material 11 being applied upon a skin 14. In the area 15 of the skin 14 touched by the tip 12 of each electrode connected to the high frequency generator, the area 15 will be subjected to a change of the protein structure resulting in a change of color.

With the device according to the invention, marking of animals alive as well as dead can be done with high speed and without the disadvantages of previously known marking devices.

I claim:

1. An apparatus for rapidly applying marking symbols to protein-containing tissue of an animal, said apparatus comprising:
    generator means for generating high frequency electromagnetic energy, said generator means having an output for said electromagnetic energy; and
    stamping means including an electrically insulating holder, at least one electrically conductive protruding portion supported by and protruding from said holder, and means electrically connecting said at least one protruding portion to said output of said generator means, said at least one protruding portion adapted to contact the protein-containing tissue to send high frequency electromagnetic energy to said tissue, the frequency of said electromagnetic energy being chosen to alter the protein structure of said tissue, and to mark the tissue with a symbol, while said stamping means remains cool in use.

2. An apparatus according to claim 1, wherein the apparatus further comprises a switching means for selectively sending said electromagnetic energy from said generating means to said at least one protruding portion.

3. An apparatus according to claim 1, wherein the generator means has an output power of from 200 to 1,000 Watts.

4. An apparatus according to claim 1, wherein the generator means generates high frequency electromagnetic energy having a frequency of at least 2 MHz.

5. An apparatus according to claim 1, wherein said stamping means comprises at least one metal symbol electrode, each electrode having at least one protruding portion.

6. An apparatus according to claim 5, wherein each protruding portion is V-shaped in cross-section.

7. An apparatus according to claim 1, wherein the electrically insulating holder is comprised of a refractory material.

8. An apparatus according to claim 1, wherein the generator means has an output resistance not exceeding 50 Ohms.

9. An apparatus according to claim 1, further comprising an earth connection means attached to the protein-containing tissue and connected electrically to ground.

10. An apparatus for rapidly applying marking symbols, which may be rapidly varied, to protein-containing tissue of an animal, said apparatus comprising:
    generator means for generating high frequency electromagnetic energy, said generator means having an output for said electromagnetic energy;
    stamping means including an input, an electrically insulating holder, at least one metal symbol electrode having a plurality of electrically conductive protruding portions which are arranged in an array, each protruding portion being insulated from other protruding portions, being supported by and protruding from said holder, and being adapted to contact the protein-containing tissue to send high frequency electromagnetic energy to said tissue, the frequency of said electromagnetic energy being chosen to alter the protein structure of said tissue and to mark the tissue with a symbol, while said stamping means remains cool in use such that the stamping means does not require cooling between repetitive applications thereof in order to vary the symbol; and
    control means having an input which is electrically connected to the output of said generator means and an output which is electrically connected to said plurality of protruding portions in order to send high frequency electromagnetic energy to only chosen protruding portions from among said plurality of protruding portions so that a symbol, which may be subsequently varied, is marked on the tissue contacted.

11. An apparatus according to claim 10, wherein the apparatus further comprises a switching means for selectively sending said electromagnetic energy from said generator means to said control device means.

12. An apparatus according to claim 10, wherein the generator means has an output power of from 200 to 1,000 Watts.

13. An apparatus according to claim 10, wherein the generator means generates high frequency electromagnetic energy having a frequency of at least 2 MHz.

14. An apparatus according to claim 10, wherein each of said plurality of protruding portions is V-shaped in cross-section.

15. An apparatus according to claim 10, wherein the electrically insulating holder is comprised of a refractory material.

16. An apparatus according to claim 10, further comprising an earth connection means attached to the protein-containing tissue and connected electrically to ground.

17. An apparatus according to claim 10, wherein the marking symbols are numerical symbols.

18. An apparatus according to claim 10, wherein the numerical symbols are alphanumerical figures and the array of protruding portions of each symbol electrode is an alphanumerical array.

19. A method for rapidly applying marking symbols to protein-containing tissue of an animal, said method comprising:

placing electrically conductive material in the form of a symbol in contact with the protein-containing tissue of an animal;

sending high frequency electromagnetic energy to said tissue through said electrically conductive material; and selecting the frequency of said electromagnetic energy so that said electrically conductive material remains cool, while altering the protein structure of said tissue and marking the tissue with said symbol.

20. A method according to claim 19, wherein said high frequency electromagnetic energy is sent to said tissue for a short period of time of at least 0.1 second.

* * * * *